United States Patent
Wolf et al.

(10) Patent No.: US 11,635,101 B2
(45) Date of Patent: Apr. 25, 2023

(54) COMPONENT, METHOD FOR PRODUCING A COMPONENT, KIT AND METHOD FOR CONNECTING COMPONENTS

(71) Applicant: NOLAX AG, Sempach Station (CH)

(72) Inventors: Thomas Wolf, Neudorf (CH); Patrick Steiner, Schattdorf (CH); Marcel Fischer, Rain (CH)

(73) Assignee: NOLAX AG, Sempach Station (CH)

( * ) Notice: Subject to any disclaimer, the term of this patent is extended or adjusted under 35 U.S.C. 154(b) by 525 days.

(21) Appl. No.: 16/620,554

(22) PCT Filed: Jun. 7, 2018

(86) PCT No.: PCT/EP2018/065026
§ 371 (c)(1),
(2) Date: Dec. 9, 2019

(87) PCT Pub. No.: WO2018/228915
PCT Pub. Date: Dec. 20, 2018

(65) Prior Publication Data
US 2020/0166063 A1    May 28, 2020

(30) Foreign Application Priority Data

Jun. 12, 2017 (EP) ..................... 17175415

(51) Int. Cl.
*F16B 5/02* (2006.01)
*B27N 3/02* (2006.01)
(Continued)

(52) U.S. Cl.
CPC .................. *F16B 5/02* (2013.01); *B27N 3/02* (2013.01); *C08G 18/10* (2013.01);
(Continued)

(58) Field of Classification Search
CPC . F16B 5/02; F16B 13/141; B27N 3/02; C08G 18/10; C08G 18/5024; C09J 5/10; C09J 175/12; C09J 2475/00; C09J 175/04
See application file for complete search history.

(56) References Cited

U.S. PATENT DOCUMENTS 3,305,996 A * 2/1967 Shapiro .................... F16B 5/01
                                                         428/116
3,771,272 A * 11/1973 Mihaly .................... F16B 5/01
                                                         52/366
(Continued)

FOREIGN PATENT DOCUMENTS

DE   10 2005 059 845 A1    6/2007
EP          1 958 975 A1    8/2008
(Continued)

OTHER PUBLICATIONS

European Search Report Corresponding to 17175415.3 dated Nov. 22, 2017.
(Continued)

*Primary Examiner* — Jason L Vaughan
*Assistant Examiner* — Amanda Kreiling
(74) *Attorney, Agent, or Firm* — Finch & Maloney PLLC (57) ABSTRACT

A component comprising a first outer region (11), at least one intermediate region (13) and a second outer region (12). The outer regions (11, 12) have a higher density and/or a higher elastic modulus than the at least one intermediate region (13). A polymer composition (21) can, preferably, be injected into the component (1) such that a mechanical connection (41) is fixed or can be fixed in the polymer composition (21). A method, a kit and the use thereof are also disclosed.

6 Claims, 4 Drawing Sheets

(51) Int. Cl.
*C08G 18/10* (2006.01)
*C08G 18/50* (2006.01)
*C09J 5/10* (2006.01)
*C09J 175/12* (2006.01)

(52) U.S. Cl.
CPC ............ *C08G 18/5024* (2013.01); *C09J 5/10* (2013.01); *C09J 175/12* (2013.01); *C09J 2475/00* (2013.01)

(56) References Cited

U.S. PATENT DOCUMENTS

| | | | |
|---|---|---|---|
| 4,224,971 A | 9/1980 | Müller et al. | |
| 4,800,643 A * | 1/1989 | Higgins | F16B 13/141 264/273 |
| 6,656,299 B1 * | 12/2003 | Grosskrueger | B29C 73/30 156/92 |
| 2010/0108260 A1 | 5/2010 | Rasche et al. | |
| 2011/0220267 A1 * | 9/2011 | Blancaneaux | F16B 5/01 156/247 |
| 2014/0212241 A1 * | 7/2014 | Burd | F16B 5/01 411/366.1 |
| 2014/0317891 A1 | 10/2014 | Steiner et al. | |
| 2016/0280976 A1 | 9/2016 | Buser | |

FOREIGN PATENT DOCUMENTS

| | | |
|---|---|---|
| EP | 2 589 478 A1 | 5/2013 |
| EP | 2 871 194 A1 | 5/2015 |

OTHER PUBLICATIONS

International Search Report Corresponding to PCT/EP2018/065026 dated Jul. 6, 2018.
Written Opinion Corresponding to PCT/EP2018/065026 dated Jul. 6, 2018.

* cited by examiner

COMPONENT, METHOD FOR PRODUCING A COMPONENT, KIT AND METHOD FOR CONNECTING COMPONENTS

The invention relates to a component, to a process for the production of a component, to a kit and to a process for the connection of components as claimed in the independent claims.

Use of lightweight components in everyday life is constantly increasing. Lightweight components in particular feature low weight and are moreover less expensive than heavy components. By way of example, aerated concrete is frequently used in the construction of houses. It provides good thermal insulation and therefore contributes to reduction of energy costs. Particle board is very frequently used in furniture construction or in the fitting-out of interiors. The versatility of particle board is attributable in particular to low-cost production.

However, these lightweight components have substantial disadvantages. One disadvantage arises when connection means, for example screws or bolts, are applied. This is typically achieved by using inserts, such as anchors, appropriate for the connection means. In a first step, the anchor is introduced into a hole, mostly one that has been previously drilled, and the connection means is introduced, with resultant anchoring. However, the low density and porosity of the material often result in inadequate anchoring of the connection means in the material when this method is used. If the connection means is exposed to excessive force, it can be broken away from its anchoring system, and an object anchored by the connection means can separate from the component. This represents a considerable safety risk.

It is therefore an object of the invention to overcome the disadvantages of the prior art. In particular, an object of the invention is to provide a component which has the advantages of a lightweight component but nevertheless permits ideal anchoring of connection means. It is moreover in particular an object of the invention to provide an automated process and/or a situation-specific method for introduction or application of a force-introducing and/or force-dissipating element into such a component.

These objects are achieved through the features of the independent claims.

The invention provides a component comprising a first exterior region, at least one intermediate region and one second exterior region. The exterior regions have higher density and/or higher modulus of elasticity than the at least one intermediate region. The first exterior region and/or the second exterior region has/have an aperture, weakened region or marking, and/or there is an aperture, weakened region or marking provided in a covering in a lateral region. A polymer composition has been introduced, in particular injected, into the at least one intermediate region, and has preferably been crosslinked. The polymer composition is arranged between the first exterior region and the second exterior region, and in essence within the at least one intermediate region and/or in the region of the aperture, weakened region or marking. The polymer composition is arranged so that a mechanical connection means projecting through the first exterior region and/or through the second exterior region and/or the covering in the lateral region can be fixed, or has been fixed, in the polymer composition.

The component of the invention differs from known sandwich boards in that the individual regions transition gradually into one another. In contrast to this, in the case of sandwich boards the intermediate layer and outer layer are clearly identifiable. The lateral region(s) of the component is/are the region(s) formed by the exterior regions and by the intermediate region.

Modulus of elasticity, also termed Young's modulus, is a value characteristic of a material, describing, in the case of linear-elastic behavior, the relationship between stress and strain during deformation of a solid body. Modulus of elasticity is stated in pascals (Pa). The modulus of elasticity of one of the exterior regions is preferably at least 10% higher than the modulus of elasticity of the at least one intermediate region. It is particularly preferable that the modulus of elasticity of the first exterior region and of the second exterior region is at least 10% higher than that of a central region of the intermediate layer. The component is preferably characterized by at least three different moduli of elasticity arranged in increasing-value sequence from a center, i.e. the central region, of the intermediate layer to the exterior regions. The moduli of elasticity of the two exterior regions can be different or identical. Opposite regions in the at least one intermediate layer can exhibit similar behavior. The modulus of elasticity can be measured by means of tension or by testing under compression, as required by the type of material. The following standards can be used for tensile tests, as required by the material:

metals: DIN EN ISO 6892-1;
plastics: ISO 527; ASTM D638;
fiber-reinforced plastics: ISO 14129;
rigid foams: ISO 1926; ASTM D1623;
fibers and filamente: ISO 5079; ASTM D3822.

The standard ASTM D3410 can be used for tests under compression.

The modulus of elasticity of a material can be related to its density, but can be independent of its density.

For the purposes of this application, the density is based on mass, i.e. the distribution of mass per unit of volume.

Density and/or modulus of elasticity increase(s) gradually from the intermediate region in the direction of the exterior regions, and therefore the peripheral regions of the exterior regions preferably have the highest density and/or the highest modulus of elasticity.

The word "covering" preferably means a sheet or a rail. It is preferable that the covering can be, or is, arranged on a side of the component of the invention in a manner such that the aperture, weakened area or marking is arranged in a region of the laterally exposed intermediate region.

The meaning of the word "fixed" here and below is that the convection means has been introduced or applied into, or to, the polymer composition. The expression "can be fixed" here and below means that the connection means can be introduced into, or applied to, the polymer composition.

By virtue of the polymer composition, the insert for a connection element is produced in situ. The word insert means here that the polymer composition is applied into the component. In an additional or alternative possibility, however, the polymer composition is applied as what is known as onsert onto the component. The anchoring properties of the connection elements can be improved by appropriate adjustment of the properties of the polymer composition and of the geometry of the insert or onsert.

The high density and/or high modulus of elasticity of the exterior regions give the component high strength with good flexibility, thus permitting omission of outer sheets and outer layers of the type used in sandwich components. Good results can be obtained in dissipating forces acting on the component to the exterior regions.

A component is thus provided which retains the advantages of a lightweight component and at the same time can accept various mechanical connections, for example various types of screw or types of screw thread, and which withstands large forces. There is moreover no requirement to adjust the insert so that it is appropriate for a defined screw or mechanical connection means, as is the case with commercially available inserts made of metal or made of plastic. The physical properties of the force-introduction point and therefore of the component can be optimized by appropriate adjustment of the properties of the polymer composition and of insert geometry. The hardness properties and elasticity properties within a connection point can moreover be adjusted in a manner that achieves optimized introduction of force into component structures. This is advantageous in particular in the case of dynamic loads. A further advantage is that by adjusting the polymer composition it is possible to achieve increased values of resistance to rotation during insertion and removal (torque values), when comparison is made with conventional fixing into inserts made of metal and plastic. Elimination of the insert made of metal or of plastic in the component of the invention can reduce the number of layer boundaries and thus reduce the risk of defects relating to adhesion and/or corrosion.

The component can be a particle board. It is possible by way of example that the density of particles in the exterior region is higher than that of the particles in the intermediate region. The particles in the exterior region can be finer and/or more compressed. It is also possible that the particles of the exterior regions have been coated with a resin. Through the selection of resin it is possible to alter the properties of the exterior regions, for example the elasticity properties, and to adjust these properties so that they are appropriate for the intended use.

The particle board can by way of example be the following types of particle board:
 OSB (oriented strand board)
 fiberboard (HDF, MDF, soft fiberboard)
 tubular particle board.

These types of particle board can be produced inexpensively, feature excellent stability, and are particularly robust and durable.

It is preferable that the component is porous or comprises porous regions, in particular the exterior regions and/or the intermediate region.

These components feature lower weight than solid components, with comparable stability and flexibility. The pores can by way of example comprise air; this leads to good insulation properties, in particular to good thermal insulation. This can by way of example be advantageous in the case of use in the construction or fitting-out of interiors of houses.

The material of the component is preferably selected from the group: plastic, preferably foamed; mineral materials, preferably foamed; fungal mycelia; metals, preferably foamed; wood.

Selection of the material leads to many possible uses. Selection of the material can moreover further optimize the properties of the component.

The mechanical connection means can be selected from the group comprising screw or threaded bolt, threaded rod, clip, bolt, bushes, sleeves, spacers, pins, nails, hooks, clamps, spring, rivets, anchors, profiles, lugs, hinges, magnets.

It is possible that the connection means is prepositioned before introduction of the polymer composition, and that the polymer composition is injected onto or around same, or that the connection means is introduced into, or applied to, the polymer composition after the latter has hardened.

The polymer composition can be selected in accordance with the formulations disclosed in EP 2 589 478 A1. These are incorporated herein by way of reference. The polymer composition is in particular an adhesive with the following properties. The adhesive is preferably a rapid-hardening two-component adhesive based on polyurea as described in EP 1 958 975 B1 or EP 2 871 194. These are incorporated by way of reference.

It is preferable that the polymer composition comprises an isocyanate-containing component A and an amine-containing component B. Component A comprises an isocyanate-terminated prepolymer with isocyanate functionality $\geq 1.7$, preferably where $1.7 < f_{NCO} < 3$, particularly preferably in the range 2 to 3. Component B comprises at least one di- and/or polyamine, preferably a polyetherdiamine and/or polyether polyamine. The stoichiometric ratio of isocyanate groups in component A to amine groups in component B in this case is 0.5 to 1.2, particularly preferably 1.

It is particularly preferable that the polymer composition comprises a first component A and a second component B. Component A comprises a monomeric polyisocyanate, in particular monomeric diisocyanate, and an isocyanate-terminated prepolymer and/or a prepolymer mixture with isocyanate functionality $\geq 1.7$, preferably where $1.7 < f_{NCO} < 3$, particularly preferably in the range 2 to 3. The second component B comprises a di- and/or polyamine, in particular a polyetherdiamine and/or a polyether polyamine, and a trimerization catalyst. The stoichiometric ratio of isocyanate groups in the first component A to isocyanate-reactive hydrogen atoms present in the second component B in the composition is 7.5 to 25, preferably 10 to 20, particularly preferably 15. Use is therefore made of a two-component polymer composition in which, in a first step, a second prepolymer is formed by way of a reaction of the polyamine with the monomeric polyisocyanate (in particular the diisocyanate) present in excess. This reaction is highly exothermic. At the same time, crosslinking of the isocyanate-terminated prepolymer of component A by amines provided in component B takes place. During the further course of the reaction, trimerization of the isocyanate groups present predominates, influenced by relevant catalysts, in particular potassium octanoate. In contrast to conventional polyurethane adhesives and conventional polyurea adhesives, the polymer composition thus exhibits not only higher tensile strength and heat resistance than other high-strength adhesives, for example epoxy resins, but also higher impact resistance.

It is also possible in principle to use other two-component liquid adhesives based on polyurethane, epoxy or acrylate that harden to give thermosets. The adhesive is described as liquid if its viscosity in the intended application state is <10 000 mPas, preferably <300 mPas, ideally <100 mPas (measured in the mixing head of the applicator at 35° C.-65° C., preferably 50° C., and at a pressure of 70-140 bar, preferably 100 bar). This mixing viscosity can be further optimized via selection of the temperature of the components.

The word "hardening" in this context means the chemical solidification of the adhesive by polymerization, polycondensation and polyaddition. The polymer composition thus provided sets rapidly, in particular as a result of a chemical reaction, and can withstand structural loads.

The aperture can be selected from the group of: slot and hole, in particular circular hole. These can be introduced mechanically by drilling, milling, punching, slotting, perforation, lasering, grinding, cutting, or by chemical or thermal methods. It is possible here that a single aperture, a plurality of apertures, a plurality of comparatively small apertures are provided, these being round, polygonal or slot-like. Undefined shapes are likewise possible. In this way it is possible to achieve particularly advantageous introduction of the polymer composition into the intermediate layer.

Selection of the aperture as non-round aperture, for example as slot, provides a connection point which ensures an interlocking connection that prevents undesired rotation of the solidified polymer composition. Relatively large forces can thus be accepted.

Concealed assembly can be achieved by selecting small, narrow apertures.

The design of the polymer composition can be such that the polymer composition forms an undercut. It is preferable here that the undercut is configured on the first exterior region and/or on the second exterior region, particularly preferably on that region of the first exterior region and/or of the second exterior region that faces toward the intermediate region. It is thus possible to form an interlocking connection between the polymer composition and the first exterior region and/or the second exterior region, so that particularly large forces can be introduced and can be dissipated to the exterior regions.

The polymer composition can moreover be designed to form a coherent, i.e. adhesive, and/or interlocking and/or frictional connection. It is preferable that the coherent connection is formed between the polymer composition and the intermediate region and/or the first exterior region and/or the second exterior region. Again, by virtue of this embodiment particularly large forces are introduced and dissipated to the exterior regions.

Another aspect of the invention provides a process for the production of a component as described above, with at least one insert and/or onsert made of a preferably crosslinkable polymer composition. The process comprises the step of provision of a component comprising a first exterior region, at least one intermediate region and one second exterior region. The exterior regions here have higher density and/or higher modulus of elasticity than the at least one intermediate region. The first exterior region and/or the second exterior region has/have an aperture, weakened region or marking, and/or there is an aperture, weakened region or marking provided in a covering of a lateral region.

The process moreover comprises the step of introduction, in particular injection, of a crosslinkable polymer composition at the location of the marking or of the weakened region, or through the aperture between the first exterior region and the second exterior region and in essence within the at least one intermediate region.

A further step is the hardening of the polymer composition between the regions so that a mechanical connection means projecting through the first exterior region and/or through the second exterior region and/or through the cover of the lateral region can be fixed in the polymer composition.

A process is thus provided which achieves, in a rapid procedure, insert and onsert solutions for lightweight structures which do not have the typical layer structure of sandwich boards. There is no need here for a predefined insert which by way of example is inserted by adhesive bonding. Furthermore, damage to the exterior regions is minimized and, unlike in conventional solutions, the location of force introduction is not confined to the diameter of the insert or onsert. The process is relatively cost-efficient, and increases the safety of the procedure. There is no requirement to provide standardized ancillary parts.

Preferred polymer compositions are those described above.

The crosslinkable polymer composition can be an adhesive, in particular a two-component adhesive. The polymer composition thus introduced is, after solidification, structurally robust and in particular non-expanding. Introduction of a large force is achieved by way of example through the screw thread of the mechanical connection means. Because the polymer composition has exothermic properties, some regions of the intermediate layer and/or of existing adhesive layers of the component can be melted during the reaction of the polymer composition. Anchoring of the polymer composition is thus improved; installation of fastening elements made of plastic, for example plastics screws, is improved. Preferred polymer compositions are as described above.

The pot life of the crosslinkable polymer composition can be in the range 1 to 15 sec, preferably 2 to 10 sec, particularly preferably 3 to 7 sec. Undesirable flow of the polymer composition away from the target location is thus avoided, and accordingly there is no need for aids to position the polymer composition, for example mesh sleeves. The component can moreover be further processed immediately, because within a very short time the polymer composition has the strength required by way of example to produce a robust connection to another component by means of the connection means.

According to DIN EN 923:1998-05, the expression "pot life" means the period during which it is possible to use a multicomponent adhesive, after mixing. Pot life is determined by "Method 3: Determination by manual application" of DIN EN 14022:2010 (German version). The short reaction time of the system must of course be taken into account here.

The process can moreover comprise the step of application or introduction of a connection means onto or into the polymer composition before or after hardening of the polymer composition. The meaning of "into the polymer composition" is that the connection means can have been prepositioned at the target location, and therefore that the polymer composition is injected around the connection means. Alternatively, the connection means is introduced into the solidified polymer composition; by way of example, a screw is screwed into same.

The connection means is preferably a connection means as described above.

A further aspect of the invention provides a kit for the production of a component, in particular of a component as described above, with at least one insert and/or onsert made of a preferably crosslinked polymer composition. The polymer composition comprises a crosslinkable, in particular two-component, polymer composition.

The kit further comprises instructions for carrying out a process as described above.

A further aspect of the invention provides a process for the production of a component by the steps described above, where the process additionally comprises the connection of the component to a further element, comprising the step of application or introduction of a connection means into the polymer composition before or after the hardening of the polymer composition.

The invention further provides the use of a component as described above in the field of road construction, and in particular commercial vehicles, cars, Formula 1, motorhomes, two-/three-wheelers, temporary road surfacings; railroad construction, in particular train, tram, cable cars; construction for the air travel industry, and in particular space travel industry, aircraft, drones, satellites; marine construction, in particular yacht and superyacht, river boats, freighters, cruise ships; construction, in particular facades and roofs, floors, bridges, elevator, escalators, mobile housing; fitting-out of interiors, in particular furniture, ceilings, walls, floors, shopfitting, construction of exhibition stands, stage construction, display, doors, partitions; sports, in particular winter sports and watersports; logistics, in particular containers, tanks, pallets, packaging; energy, in particular wind turbines, solar installations; mechanical engineering, in particular stamping tools, cladding, moving parts; medicine, in particular dental implants, other implants, fixings; defense technology, in particular rockets.

The invention is described in more detail below with reference to examples.

It should be noted at this point that the drawings serve for symbolic representation of the invention.

Figure 1:
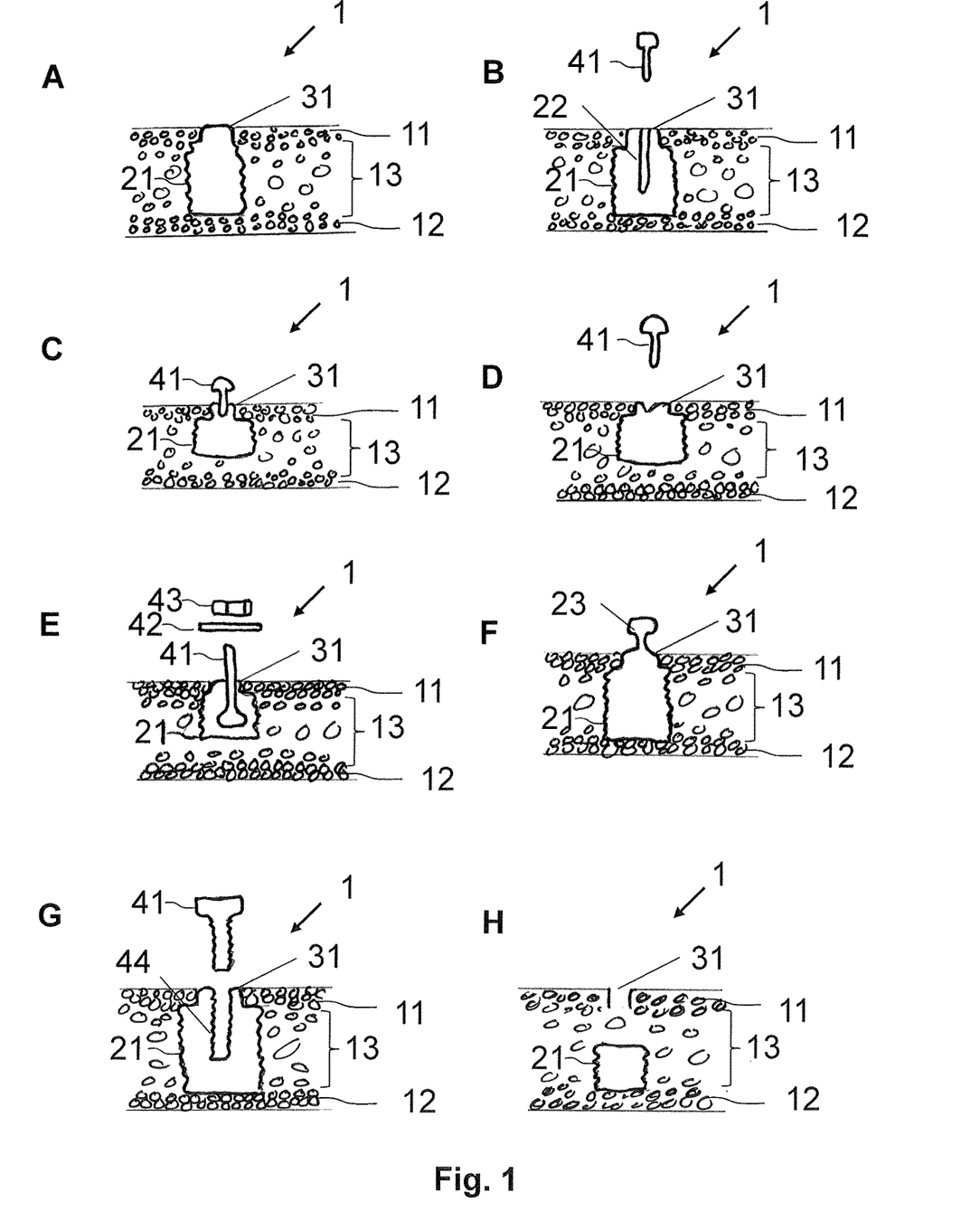
FIG. 1: shows sectional sketches of components of the invention with polymer compositions as inserts (variants A to H)

FIG. 1 shows a component 1 of the invention having a first exterior region 11 and a second exterior region 12, which transition into an intermediate region 13. For the embodiments described below, an aperture 31 was drilled through the first exterior region 11 and material of the intermediate region 13 was removed. In the region of an aperture 31 and in the region of the intermediate region 13 there is a crosslinked polymer composition 21 as insert.

In variant A, the polymer composition 21 is in contact with the second exterior region 12. A connection means can be applied onto or introduced into the polymer composition 21; by way of example, a screw can be screwed into same.

In variant B, the polymer composition 21 has a cutout 22 designed for the introduction of a connection means, in this case a screw 41.

Variant C shows a polymer composition 21 as insert which is not in contact with the second exterior region 12. A screw 41 has been inserted here into the polymer composition 21.

Variant D shows a polymer composition 21 as insert which is not in contact with the second exterior region 12, and has a positioning aid, in this case a notch, in the polymer composition in the region of the aperture 31. By means of the positioning aid, a screw 41 is positioned and introduced at the central region of the polymer composition.

Variant E shows a polymer composition 21 as insert which is not in contact with the second exterior region 12, and has a prepositioned threaded bolt 41 in the polymer composition, where the screw thread of the threaded bolt projects out of the component 1 through an aperture 31. The threaded bolt 41 was positioned in the region of the intermediate region 13 before introduction of the polymer composition 21, and the polymer composition 21 was then injected around same. A washer 42 and a nut 43 can be applied to the exposed screw thread of the threaded bolt 41.

Variants C, D and E are particularly advantageous for the decoupling of vibrations and for acoustic and/or thermal decoupling. Forces directed only onto one of the exterior regions can moreover be diverted.

In variant F, the polymer composition 21 is in contact with the second exterior region 12. The polymer composition 21 projects out of the first exterior region 11 through the aperture 31, and has a positioning element or fixing element 23. A further element designed so that it forms an interlocking connection with positioning element or fixing element 23 can be attached on the positioning element or fixing element 23. Positioning elements or fixing elements can be lugs, angles, studs, clips, sleeves, internal screw threads, screws or threaded bolts, pins, cutouts, projections, rails, barbs or rivets.

In variant G, the polymer composition 21 has an internal screw thread 44 designed for the insertion of a screw or threaded bolt 41.

Variant H shows a component 1 where the polymer composition 21 is in contact with the second exterior region 12 but not with the first exterior region 11. This is particularly advantageous for the decoupling of vibrations, and for acoustic and/or thermal decoupling. Forces directed only onto one of the exterior regions can moreover be dissipated.

Figure 2:
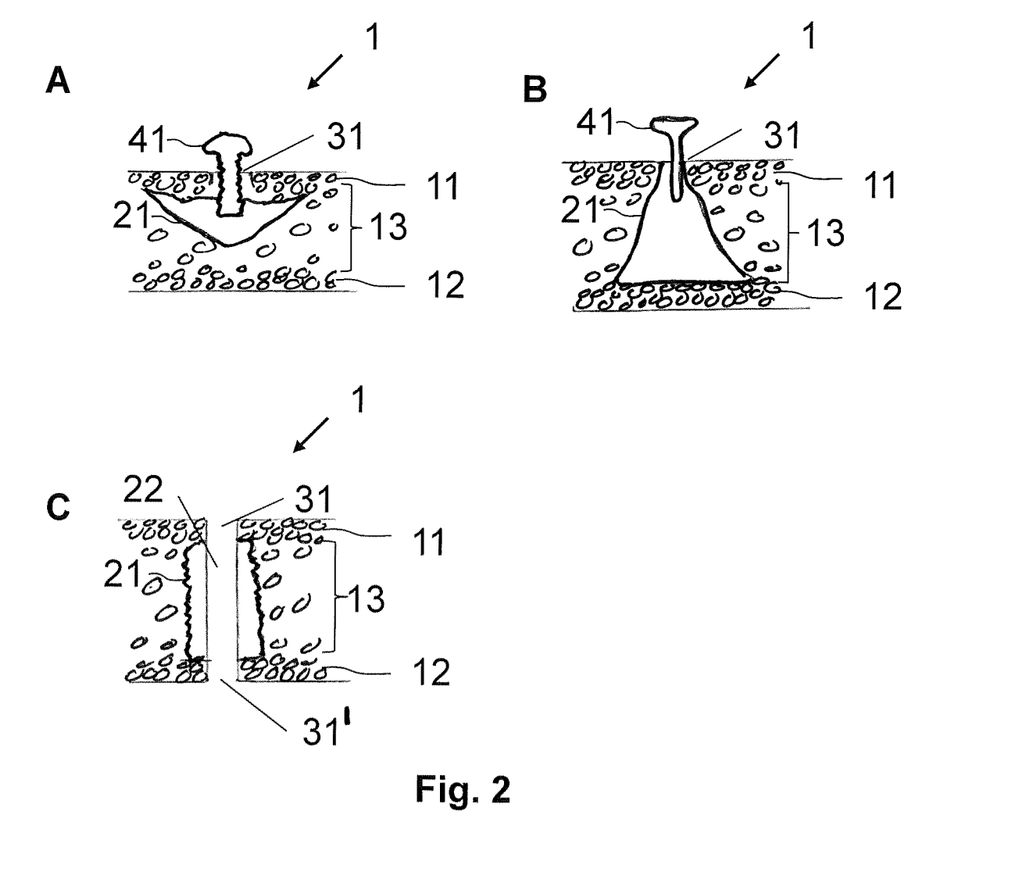
FIG. 2: shows sectional sketches of components of the invention with polymer compositions as inserts (variants A to C)

FIG. 2 shows further components 1 of the invention having a first exterior region 11 and a second exterior region 12, with an intermediate region 13 arranged between the two exterior regions 11, 12. The first exterior region and the second exterior region transition gradually into the intermediate region. In variant A, the first exterior region 11 has an aperture 31. The material of the intermediate region is removed by specific undercut milling, and the shape of the subsequently introduced polymer composition 21 in the intermediate region is thus prescribed. A crosslinkable polymer composition 21 has been injected through the aperture 31 into a region of the intermediate region 13. The polymer composition 21 forms an undercut and is in some regions in contact with that portion of the first exterior region 11 that faces toward the intermediate region 13. An undercut has thus been formed on the first exterior region 11. A screw 41 has been positioned in the crosslinked polymer composition 21. High force input is thus ensured. Variant A is particularly advantageous for the decoupling of vibrations, and for acoustic and/or thermal decoupling. Forces directed only onto one of the exterior regions can moreover be dissipated.

In variant B, the polymer composition 21 is in contact with the second exterior region 12. The shape of the polymer composition 21 in the hardened state here is selected in a manner that ensures improved force input. In the region of contact between the polymer composition 21 and the second exterior region 12, the polymer composition 21 is broadened in comparison with the region of the aperture 31, thus permitting high force dissipation onto the exterior region 12.

In variant C, the polymer composition 21 is in contact with the first exterior region 11 and with the second exterior region 12. In the first exterior region 11, there is an aperture 31. In the second exterior region 12, there is an aperture 31'. The polymer composition 21 also serves as spacer for the two exterior regions 11, 12 in the event of local pressure perpendicular to the regions. The polymer composition 21 has a cutout 22 extending from the aperture 31 to the aperture 31'. It is thus possible to pass, and position, a connection means, for example a pin, through the apertures 31, 31'. It is thus possible to design force-inputting connections through the first exterior region 11 and the second exterior region 12.

Figure 3:
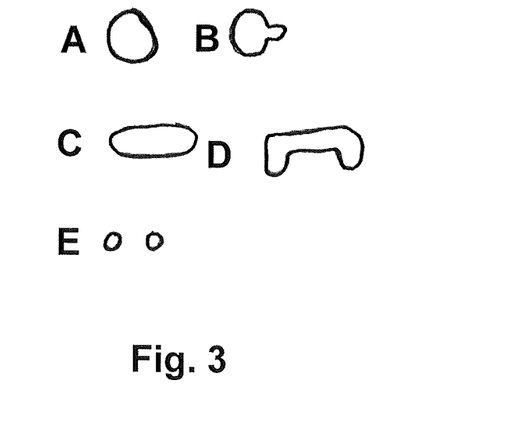
FIG. 3: shows variants of possible apertures of the component of the invention.

FIG. 3 shows apertures of a component of the invention (cf. 31 in FIGS. 1 and 2). The aperture can be designed to be circular (variant A), or circular with at least one notch (variant B), or as straight slot (variant C), or as slot curved on one side or as slot curved on both sides (variant D). The aperture can equally have a plurality of, preferably two, circular apertures for introduction of the polymer composition of the component of the invention (variant E). In the variants B to E, the apertures serve to prevent undesired rotation of the polymer composition (cf. 21 in FIGS. 1 and 2) in the component (cf. 1 in FIGS. 1 and 2), insofar as the polymer composition is arranged in the region of the aperture.

Figure 4:
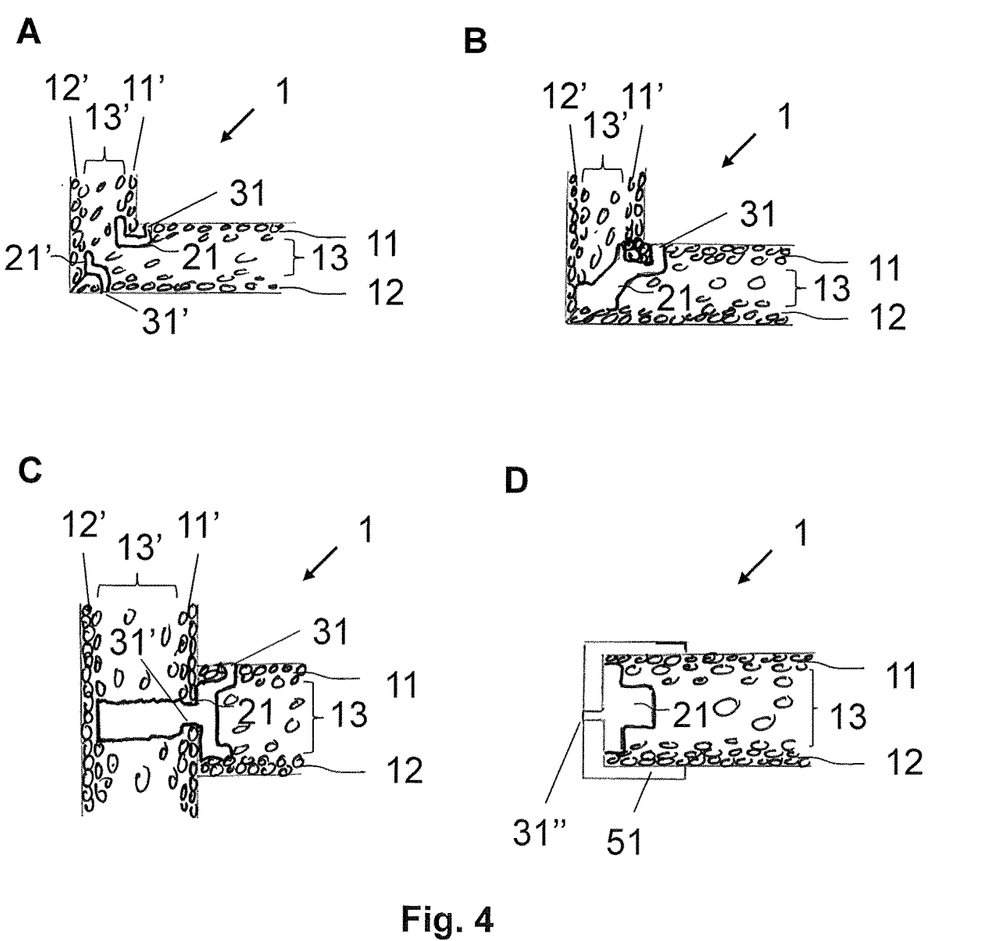
FIG. 4: shows sectional sketches of components of the invention as corner (A, B), T (C) connection or end connection (D)

FIG. 4 shows components of the invention with corner connections (variants A, B), T (variant C) connections or end connections (variant D).

Variant A shows a component 1 with a first component and a second component. The first component is formed by a first exterior region 11 and by a second exterior region 12, where the exterior regions 11 and 12 transition gradually into an intermediate region 13. The first exterior region 11 has an aperture 31. The second exterior region 12 has an aperture 31'. The second component is composed of a first exterior region 11' and of a second exterior region 12', where the exterior regions 11' and 12' transition gradually into an intermediate region 13'. The first component and the second component form a corner connection, where the first exterior region 11 is in contact with the first exterior region 11', the second exterior region 12 is in contact with the second exterior region 12' and the intermediate region 13 is in contact with the intermediate region 13'.

A first polymer composition 21 has been injected through the apertures 31 into a region of the intermediate region 13 and into a region of the intermediate region 13', the polymer composition 21 here being in contact with those regions of the exterior regions 11 and 11' that face toward the intermediate regions 13 and 13'. A second polymer composition 21' has been injected in identical fashion through the aperture 31' into a region of the intermediate region 13 and into a region of the intermediate region 13', the polymer composition 21 here being in contact with those regions of the exterior regions 12 and 12' that face toward the intermediate regions 13 and 13'. It is preferable that the first polymer composition 21 and the second polymer composition 21' have the same chemical constitution. This is a particularly simple way of forming a corner connection between two components. The advantages explained above for components apply in identical fashion here.

Variant B differs from variant A in that there is a single aperture 31 configured in the first exterior region 11, and a polymer composition 21 is injected through said aperture. The polymer composition 21 here is in contact with those regions of the exterior regions 11, 11', 12, 12' that face toward the intermediate regions 13 and 13'. The polymer composition 21 forms a brace between the exterior regions in the region of the corner connection. This is a particularly simple way of forming a corner connection between two components. The advantages explained above for components apply in identical fashion here.

Variant C shows a T connection of a first component and of a second component. The first component is designed as described for variant B. The second component has an aperture 31' in the first exterior region 11'. The first and the second component are arranged at an angle of in essence 90°. The aperture 31' of the second component is arranged in the region of the intermediate region 13 of the first component. Other angles are equally possible for specific applications. A polymer composition 21 is injected through the aperture 31 into a region of the intermediate region 13 and into a region 13'. A proportion of the polymer composition 21 here passes through the aperture 31' into the intermediate region 13'. The polymer composition 21 connects the exterior regions 11, 12, 11' and 12'. This is a simple way of forming a T connection of two components. The advantages explained above for components apply in identical fashion here.

Variant D shows a component 1 having a first exterior region 11 and a second exterior region 12, where the exterior regions 11, 12 transition gradually into an intermediate region 13. In an end region of the exterior regions 11 and 12 there is a covering arranged as rail 51, which is in contact with those regions of the exterior regions 11 and 12 that face away from the intermediate region 13 and with that portion of the intermediate region 13 that is not in contact with the exterior regions 11, 12. The rail 51 has an aperture 31" arranged in the abovementioned region of the intermediate region 13. A polymer composition 21 has been injected through the aperture 31" into the end region of the intermediate region 13. The polymer composition is in contact with surfaces of the exterior regions 11 and 12 which face toward the intermediate region 13.

Figure 5:
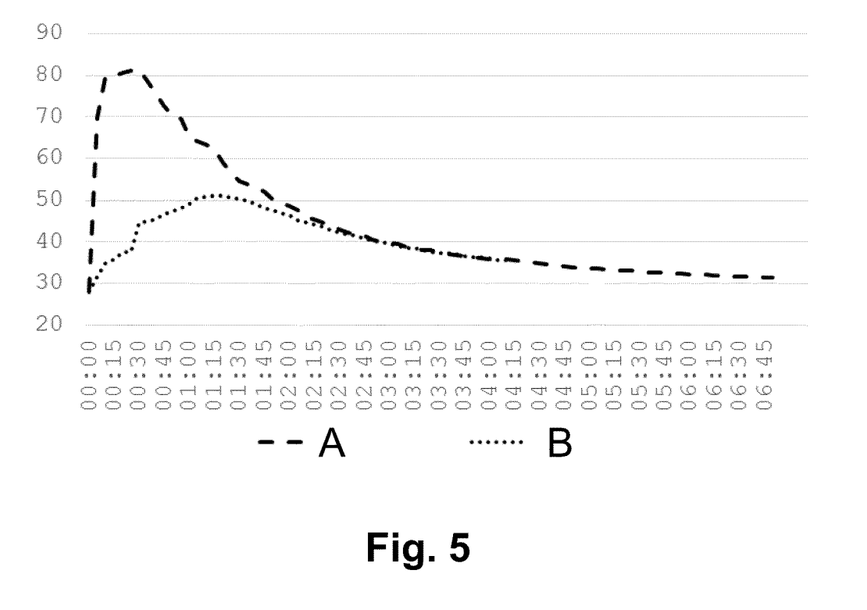
FIG. 5: shows exothermic behavior during introduction of the polymer composition in comparison with liquid pegging.

FIG. 5 shows the temperature curve of a polymer composition (A) of the invention and of commercially available liquid anchoring system (B), measured in the core. The time in min:sec is plotted on the X-axis, and the temperature in ° C. is plotted on the Y-axis. For purposes of comparison, a two-part polyethylene mold was produced. The mold has a circular hole with diameter 10 mm and depth 15 mm. The polymer compositions were introduced by means of cartridges at room temperature, and the temperature curve was measured by a temperature sensor, and recorded. The temperature was measured at a depth of 4 mm.

The temperature curve for both systems is exothermic; the core temperature of the polymer composition of the invention (A, core 3058_1) being significantly higher, at 80° C., than that of the comparative composition of the liquid anchoring system (B) with core temperature 50° C. Said temperature is moreover reached more rapidly, i.e. within 15 sec. The comparative composition reaches the maximal core temperature after about 1 min 15 sec.

The polymer composition of the invention therefore achieves better anchoring in a component, for example via incipient melting or complete melting of the intermediate region made of thermoplastic, for example of components with an intermediate region made of polystyrene. This method can moreover by way of example achieve improved anchoring of plastics screws in the polymer composition introduced.

What is claimed is:

1. A process for production of a component with at least one of an insert and an onset made of a polymer composition, the process comprising the steps of:
    providing a component comprising a first exterior region, at least one intermediate region and one second exterior region, where the first and the second exterior regions have at least one of a higher density and a higher modulus of elasticity than the at least one intermediate region and wherein the individual regions transition gradually into one another, and where at least one of the first exterior region and the second exterior region has an aperture, weakened region or marking, and/or there is an aperture, weakened region or marking provided in a covering in a lateral region,
    introducing a crosslinkable polymer composition at the location of the marking or of the weakened region, or through the aperture between the first exterior region and the second exterior region and in essence within the at least one intermediate region, hardening of the polymer composition between the regions so that a mechanical connection means projecting through at least one of the first exterior region, the second exterior region and the covering of the lateral region can be fixed in the polymer composition.

2. The process according to claim 1, where the crosslinkable polymer composition is an adhesive.

3. The process according to claim 2, where the crosslinkable polymer composition is a two-component adhesive.

4. The process according to claim 1, where a pot life of the crosslinkable polymer composition is in the range of 1 to 15 sec.

5. The process according to claim 1, comprising the step of applying or introducing a connection means onto or into the polymer composition before or after hardening of the polymer composition.

6. The process according to claim 1, additionally comprising the step of connection of the component to another element, comprising the step of applying or introducing a connection means into the polymer composition before or after hardening of the polymer composition.

\* \* \* \* \*